(12) United States Patent
Lin et al.

(10) Patent No.: US 10,871,613 B2
(45) Date of Patent: Dec. 22, 2020

(54) OPTICAL WAVEGUIDE APPARATUS AND DISPLAY

(71) Applicant: Coretronic Corporation, Hsin-Chu (TW)

(72) Inventors: Meng-Hsuan Lin, Hsin-Chu (TW); Chih-Wei Shih, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/358,656

(22) Filed: Mar. 19, 2019

(65) Prior Publication Data
US 2019/0302358 A1 Oct. 3, 2019

(30) Foreign Application Priority Data

Mar. 30, 2018 (CN) .......................... 2018 1 0297008

(51) Int. Cl.
*G02B 6/122* (2006.01)
*G02B 6/34* (2006.01)
(Continued)

(52) U.S. Cl.
CPC ........... *G02B 6/122* (2013.01); *G02B 6/0016* (2013.01); *G02B 6/0031* (2013.01); *G02B 6/34* (2013.01);
(Continued)

(58) Field of Classification Search
CPC ........ G02B 6/122; G02B 6/0016; G02B 6/34; G02B 6/0031; G02B 27/0172;
(Continued)

(56) References Cited

U.S. PATENT DOCUMENTS

| 8,189,263 B1 | 5/2012 | Wang et al. |
| 9,279,984 B2 * | 3/2016 | Aiki ................... G02B 27/0172 |

(Continued)

FOREIGN PATENT DOCUMENTS

| CN | 102162936 | 8/2011 |
| CN | 104089701 | 10/2014 |
| EP | 2196729 | 6/2010 |

OTHER PUBLICATIONS

"Search Report of Europe Counterpart Application," dated Aug. 30, 2019, pp. 1-10.

(Continued)

*Primary Examiner* — Ryan A Lepisto
(74) *Attorney, Agent, or Firm* — JCIPRNET

(57) ABSTRACT

An optical waveguide apparatus including an optical waveguide element and an optical recycling element is provided. The optical waveguide element includes a first surface and a second surface opposite to the first surface. The first surface or the second surface includes an optical structure. An incident light enters the optical waveguide element via the first surface and is transmitted to the second surface. The optical recycling element is disposed on the second surface of the optical waveguide element. The incident light is transmitted to the optical recycling element via the second surface. The optical recycling element changes a transmission direction of the incident light to generate a recycled light. The recycled light enters the optical waveguide element via the second surface and is transmitted to the first surface.

14 Claims, 10 Drawing Sheets

(51) Int. Cl.
  *G02B 27/01* (2006.01)
  *F21V 8/00* (2006.01)
  *G03B 21/20* (2006.01)

(52) U.S. Cl.
  CPC ..... *G02B 27/0101* (2013.01); *G02B 27/0172* (2013.01); *G03B 21/2066* (2013.01); *G02B 2027/0112* (2013.01); *G02B 2027/0118* (2013.01)

(58) Field of Classification Search
  CPC ........ G02B 27/0101; G02B 2027/0112; G02B 2027/0118; G03B 21/2066
  See application file for complete search history.

(56) References Cited

U.S. PATENT DOCUMENTS

| | | |
|---|---|---|
| 2006/0269213 A1 | 11/2006 | Hwang et al. |
| 2008/0278812 A1* | 11/2008 | Amitai ................ G02B 27/285 359/485.05 |
| 2016/0077338 A1 | 3/2016 | Robbins et al. |
| 2017/0030788 A1 | 2/2017 | Boysel et al. |
| 2017/0255016 A1 | 9/2017 | Tinch et al. |
| 2018/0082644 A1 | 3/2018 | Bohn |
| 2018/0164638 A1* | 6/2018 | Yoon ................ G02F 1/133553 |

OTHER PUBLICATIONS

"Office Action of China Counterpart Application", dated Mar. 23, 2020, p. 1-p. 9.

\* cited by examiner

OPTICAL WAVEGUIDE APPARATUS AND DISPLAY

CROSS-REFERENCE TO RELATED APPLICATION

This application claims the priority benefit of China application serial no. 201810297008.7, filed on Mar. 30, 2018. The entirety of the above-mentioned patent application is hereby incorporated by reference herein and made a part of this specification.

BACKGROUND OF THE INVENTION

Field of the Invention

The disclosure relates to an optical apparatus, and in particular, to an optical waveguide apparatus and a display including the optical waveguide apparatus.

Description of Related Art

A diffractive waveguide involves a method based on the principle of optical diffraction in which a diffraction phenomenon occurs after a light passes through slit-like microstructures, such that a direction of the light is changed. However, in a diffractive optical framework, optical efficiency is the biggest issue. Due to the diffraction element, much energy is lost because zero-order light is not re-used. In a diffractive waveguide system, properties including the cycle, the material, and the shape of the optical microstructures all influence the progression direction, the progression angle, and efficiency of the light. Therefore, how to design high-efficiency optical microstructures and maintain manufacturing feasibility is one of the issues to overcome in the field of diffractive waveguides. In some related art, the loss in optical energy is reduced by changing the optical microstructures. However, according to such method, it is difficult to effectively control the quality of the optical microstructures in production. Therefore, the issue of low light transmission efficiency is still present in the diffractive waveguides currently available.

The information disclosed in the "Description of Related Art" section is only intended for enhancing understanding of the background of the invention and therefore it may contain information that does not form the related art already known to a person of ordinary skill in the art. The disclosure in the "Description of Related Art" section does not mean that one or more problems to be solved by one or more embodiments of the invention were acknowledged by a person of ordinary skill in the art.

SUMMARY OF THE INVENTION

The embodiments of the invention provide an optical waveguide apparatus that effectively enhances light beam transmission efficiency of the optical waveguide apparatus and reduces optical energy loss caused in a light beam output by a projection apparatus to the optical waveguide apparatus to enhance a brightness of an image displayed by a display including the optical waveguide apparatus and meanwhile effectively maintain a resolution of the image. Moreover, a color temperature of the light beam output by the optical waveguide apparatus is substantially consistent with a color temperature of a light beam output by the projection apparatus.

Other purposes and advantages of the embodiments of the invention may be further understood according to the technical features disclosed herein.

To achieve one, part, or all of the foregoing purposes or other purposes, an embodiment of the invention provides an optical waveguide apparatus including an optical waveguide element and an optical recycling element. The optical waveguide element includes a first surface and a second surface opposite to the first surface. The first surface or the second surface includes an optical structure. An incident light enters the optical waveguide element via the first surface and is transmitted to the second surface. The optical recycling element is disposed on the second surface of the optical waveguide element. The incident light is transmitted to the optical recycling element via the second surface. The optical recycling element changes a transmission direction of the incident light to generate a recycled light. The recycled light enters the optical waveguide element via the second surface and is transmitted to the first surface. The incident light and the recycled light are transmitted in the optical waveguide element.

To achieve one, part, or all of the foregoing purposes or other purposes, an embodiment of the invention provides a display for projecting an image light beam to a projection target, and the display includes a projection apparatus and an optical waveguide apparatus. The projection apparatus projects an incident light, and the incident light is the image light beam. The optical waveguide apparatus includes an optical waveguide element and an optical recycling element. The optical waveguide element includes a first surface and a second surface opposite to the first surface. The first surface or the second surface includes an optical structure. An incident light enters the optical waveguide element via the first surface and is transmitted to the second surface. The optical recycling element is disposed on the second surface of the optical waveguide element. The incident light is transmitted to the optical recycling element via the second surface. The optical recycling element changes a transmission direction of the incident light to generate a recycled light. The recycled light enters the optical waveguide element via the second surface and is transmitted to the first surface. The incident light and the recycled light are transmitted in the optical waveguide element and are transmitted to the projection target.

Accordingly, the embodiments of the invention at least exhibit one of the advantages or effects below. The optical waveguide apparatus of the embodiments of the invention includes the optical recycling element and effectively enhances light beam transmission efficiency of the optical waveguide apparatus and reduces optical energy loss caused in a light beam output by the projection apparatus to the optical waveguide apparatus to enhance a brightness of an image displayed by the display including the optical waveguide apparatus and meanwhile effectively maintain a resolution of the image. Moreover, a color temperature of the light beam output by the optical waveguide apparatus is substantially consistent with a color temperature of a light beam output by the projection apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
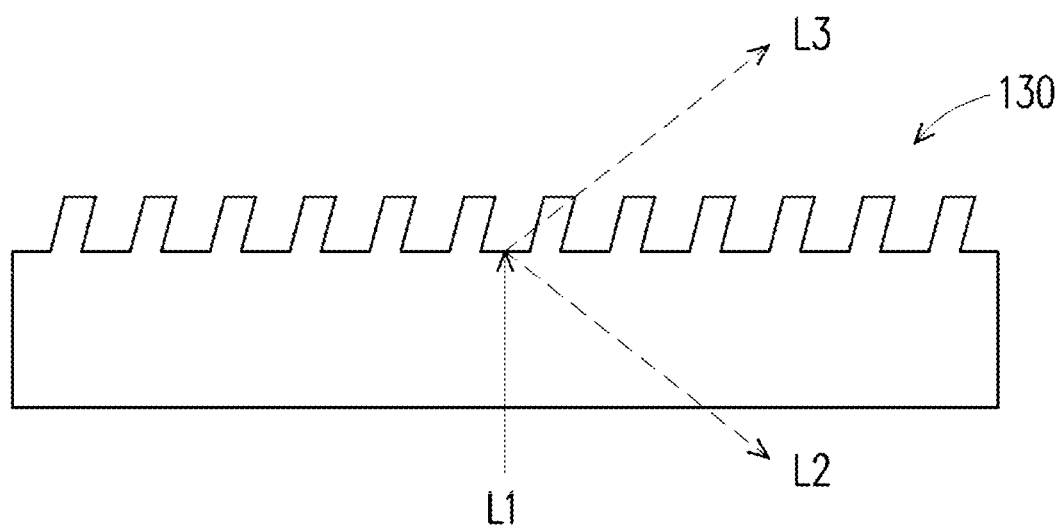
FIG. 1 is a schematic diagram illustrating an optical structure according to an embodiment of the invention.

FIG. 1 is a schematic diagram illustrating an optical structure according to an embodiment of the invention. Referring to FIG. 1, in the embodiment, as an incident light L1 enters an optical structure 130, diffraction effect of light occurs. Therefore, when the incident light L1 passes through a light-transmissive microstructure region, a reflective diffracted light L2 and a refractive diffracted light L3 are generated. In the embodiment, the diffracted light L2 and the diffracted light L3 are first-order diffracted lights.

Figure 2:
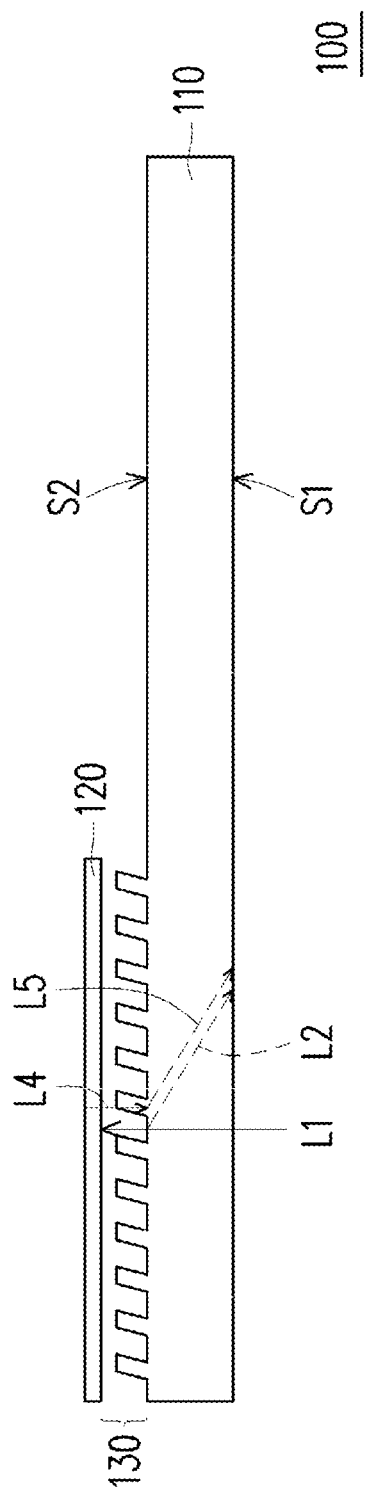
FIG. 2 is a schematic diagram illustrating an optical waveguide apparatus according to an embodiment of the invention.

FIG. 2 is a schematic diagram illustrating an optical waveguide apparatus according to an embodiment of the invention. Referring to FIG. 2, an optical waveguide apparatus 100 of the embodiment includes an optical waveguide element 110 and an optical recycling element 120. The optical waveguide element 110 includes a first surface S1 and a second surface S2. The second surface S2 is opposite to the first surface S1 and includes the optical structure 130. The optical recycling element 120 is disposed on a side of the second surface S2 of the optical waveguide element 110.

In the embodiment, the incident light L1 enters the optical waveguide element 110 via the first surface S1. The incident light L1 is transmitted to the optical structure 130 of the second surface S2 to generate the reflective diffracted light L2. The incident light L1 is transmitted to the optical recycling element 120 via the optical structure 130 of the second surface S2. The optical recycling element 120 changes a transmission direction of the incident light L1 to generate a recycled light L4. In the embodiment, the recycled light L4 is, for example, a zero-order diffracted light that is generated after the incident light L1 passes through the optical structure 130 and is reflected by the optical recycling element 120 and then enters the optical waveguide element 110 again. In an embodiment, the recycled light L4 may also be a first-order or high-order diffracted light. The recycled light L4 enters the optical waveguide element 110 via the optical structure 130 of the second surface S2 and is transmitted to the first surface S1. When the recycled light L4 passes through the light-transmissive microstructure region, a refractive diffracted light L5 is generated. The diffracted light L2 is a portion of the incident light L1 and is transmitted in the optical waveguide element 110. The diffracted light L5 is a portion of the recycled light L4 and is transmitted in the optical waveguide element 110.

The incident light L1 is reflected by the optical recycling element 120 due to the optical structure 130 and enters the optical waveguide element 110 again via the optical structure 130 to be transmitted in the optical waveguide element 110. Therefore, light utilization efficiency of the optical waveguide element 110 can be enhanced.

Figure 3:
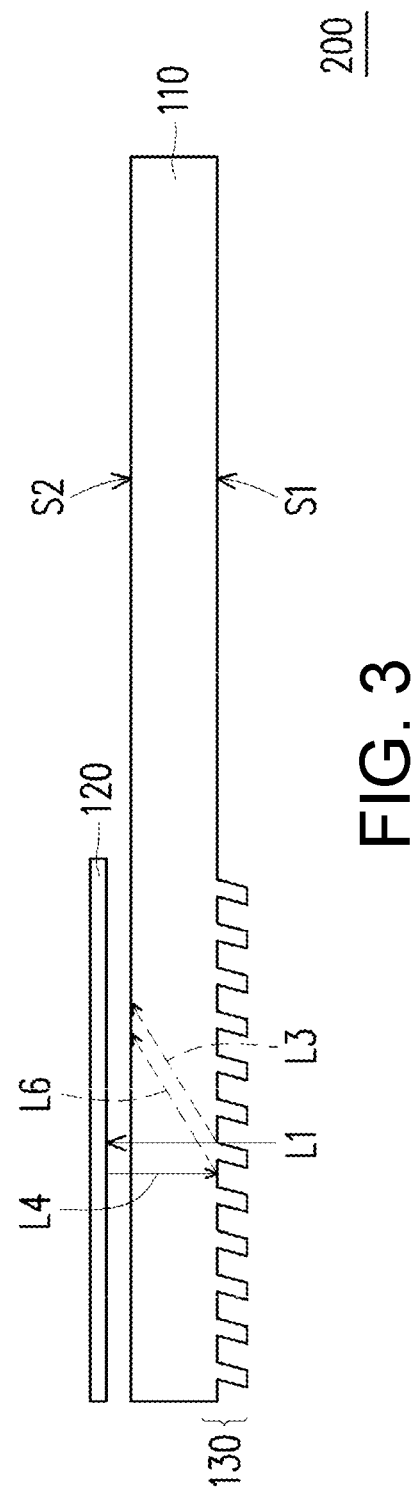
FIG. 3 is a schematic diagram illustrating an optical waveguide apparatus according to another embodiment of the invention.

FIG. 3 is a schematic diagram illustrating an optical waveguide apparatus according to another embodiment of the invention. Referring to FIG. 2 and FIG. 3, an optical waveguide apparatus 200 of the embodiment is similar to the optical waveguide apparatus 100 of FIG. 2, and a difference between the two lies in, for example, including the optical structure 130 on the first surface S1.

In the embodiment, the incident light L1 enters the optical waveguide element 110 via the first surface S1, and a refractive diffracted light L3 is generated at the optical structure 130. The incident light L1 is transmitted to the optical recycling element 120 via the second surface S2. The optical recycling element 120 changes a transmission direction of the incident light L1 to generate a recycled light L4. In the embodiment, the recycled light L4 is, for example, a zero-order diffracted light that is generated after the incident light L1 passes through the optical structure 130 and is reflected by the optical recycling element 120 and then enters the optical waveguide element 110 again. In an embodiment, the recycled light L4 may also be a first-order or high-order diffracted light. The recycled light L4 enters the optical waveguide element 110 via the second surface S2. The recycled light L4 is transmitted to the first surface S1 to generate a reflective diffracted light L6 at the optical structure 130. In other words, when the recycled light L4 passes through the light-transmissive microstructure region, the reflective diffracted light L6 is generated. The diffracted light L3 is a portion of the incident light L1 and is transmitted in the optical waveguide element 110. The diffracted light L6 is a portion of the recycled light L4 and is transmitted in the optical waveguide element 110.

The incident light L1 is reflected by the optical recycling element 120 due to the optical structure 130 and enters the optical waveguide element 110 again via the optical structure 130 to be transmitted in the optical waveguide element 110. Therefore, light utilization efficiency of the optical waveguide element 110 can be enhanced.

In the embodiments of FIG. 2 and FIG. 3, the optical recycling element 120 is, for example, an optical element having a reflection function, such as a reflection mirror, a band pass filter, and a dichroic mirror. In an embodiment, the optical recycling element 120 may also be an optical film layer, a diffraction element, or a planar optical element.

Figure 4:
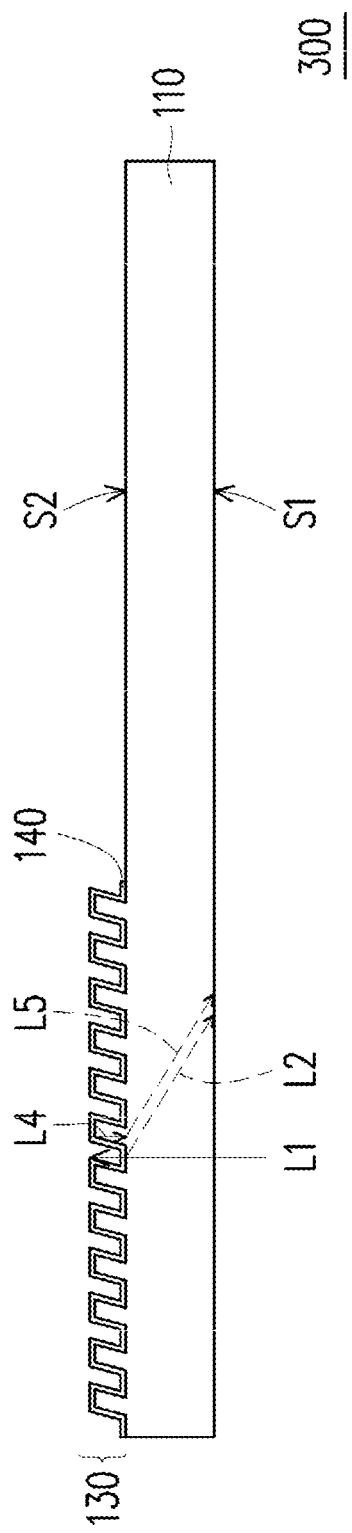
FIG. 4 is a schematic diagram illustrating an optical waveguide apparatus according to another embodiment of the invention.

FIG. 4 is a schematic diagram illustrating an optical waveguide apparatus according to another embodiment of the invention. Referring to FIG. 2 and FIG. 4, an optical waveguide apparatus 300 of the embodiment is similar to the optical waveguide apparatus 100 of FIG. 2, and a difference between the two lies in, for example, that an optical recycling element 140 of the embodiment is, for example, an optical film layer. The optical recycling element 140 is formed by coating a reflective material on the surface of the optical structure 130 and is configured to reflect the diffracted light transmitted from the optical waveguide element 110, such that the diffracted light enters the optical waveguide element 110 again. Thereby, light utilization efficiency of the optical waveguide element 110 can be enhanced.

Figure 5:
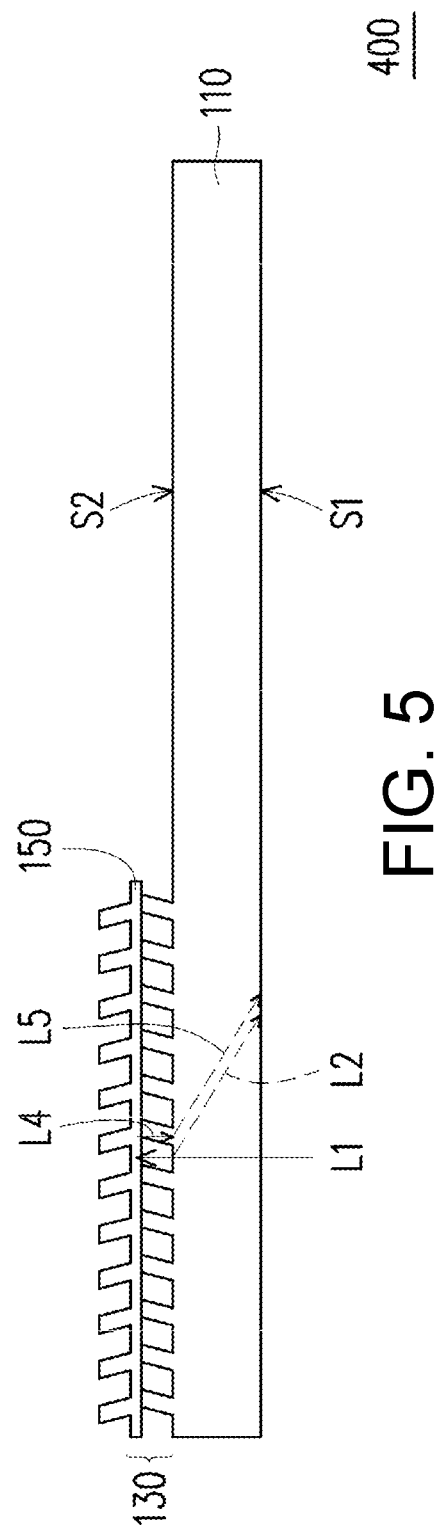
FIG. 5 is a schematic diagram illustrating an optical waveguide apparatus according to another embodiment of the invention.

FIG. 5 is a schematic diagram illustrating an optical waveguide apparatus according to another embodiment of the invention. Referring to FIG. 2 and FIG. 5, an optical waveguide apparatus 400 of the embodiment is similar to the optical waveguide apparatus 100 of FIG. 2, and a difference between the two lies in, for example, that an optical recycling element 150 of the embodiment is, for example, a diffraction element having a reflection function. The diffraction element may include another optical structure different from the optical structure 130 or includes a grating structure. The optical recycling element 150 is disposed on a side of the second surface S2 of the optical waveguide element 110 to reflect the diffracted light transmitted from the optical structure 130, such that the diffracted light enters the optical waveguide element 110 again. Thereby, light utilization efficiency of the optical waveguide element 110 can be enhanced.

Figure 6:
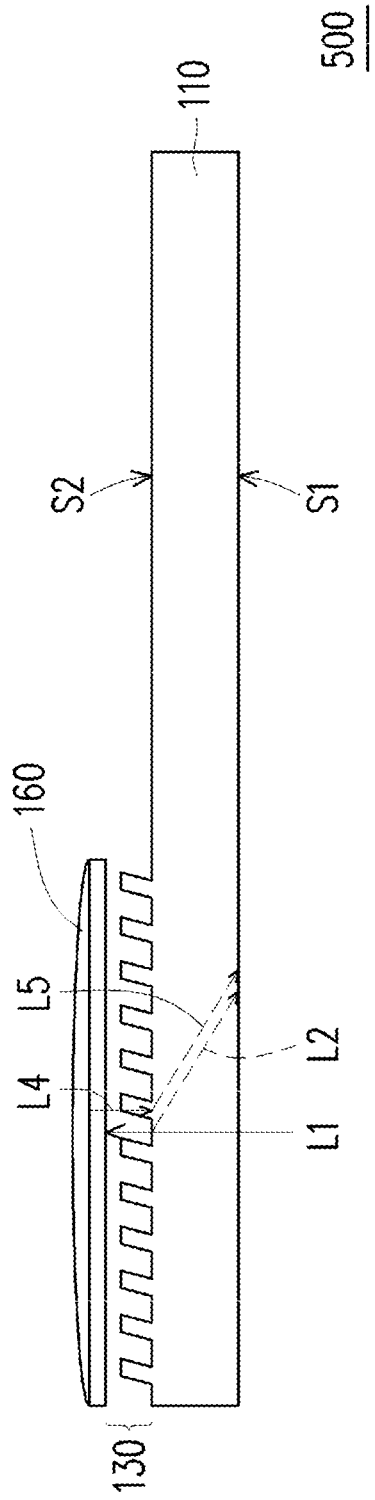
FIG. 6 is a schematic diagram illustrating an optical waveguide apparatus according to another embodiment of the invention.

FIG. 6 is a schematic diagram illustrating an optical waveguide apparatus according to another embodiment of the invention. Referring to FIG. 2 and FIG. 6, an optical waveguide apparatus 500 of the embodiment is similar to the optical waveguide apparatus 100 of FIG. 2, and a difference between the two lies in, for example, that an optical recycling element 160 of the embodiment is, for example, a planar optical element. The planar optical element is, for example, a liquid crystal lens, a Fresnel lens, or is an optical element including a metasurface. The optical recycling element 160 is disposed on a side of the second surface S2 of the optical waveguide element 110 to reflect the diffracted light, such that the diffracted light enters the optical waveguide element 110 again. Thereby, light utilization efficiency of the optical waveguide element 110 can be enhanced.

In the embodiments of FIG. 2 to FIG. 6, the optical waveguide element 110 includes one single waveguide plate, but the invention is not limited hereto. In an embodiment, the optical waveguide element may also include a plurality of waveguide plates.

Figure 7:
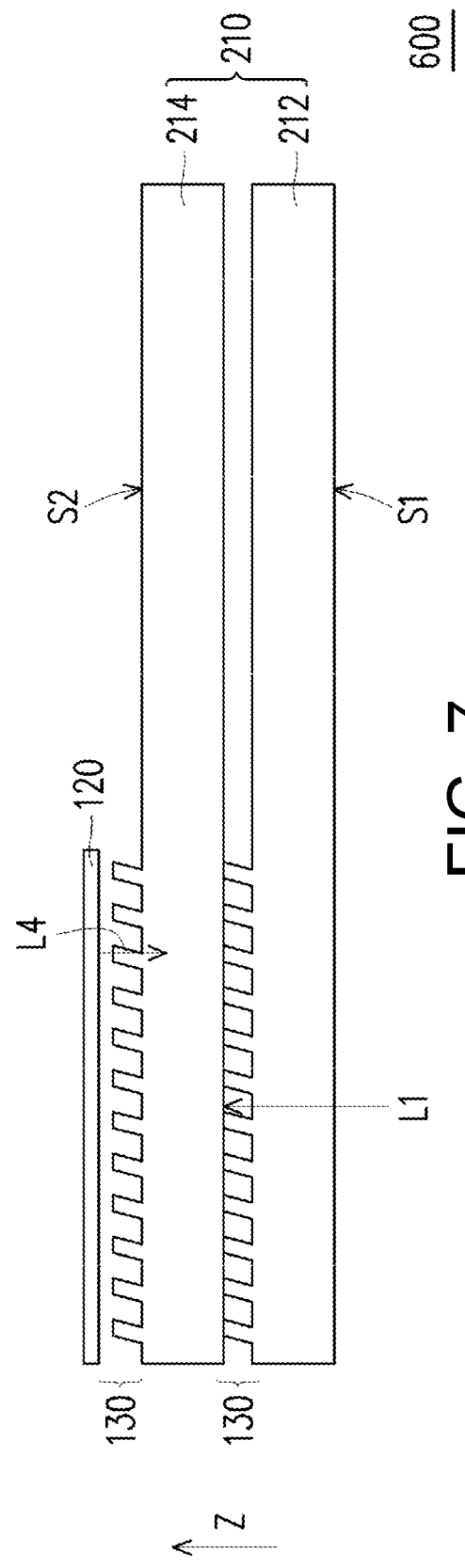
FIG. 7 is a schematic diagram illustrating an optical waveguide apparatus according to another embodiment of the invention.

FIG. 7 is a schematic diagram illustrating an optical waveguide apparatus according to another embodiment of the invention. Referring to FIG. 2 and FIG. 7, an optical waveguide apparatus 600 of the embodiment is similar to the optical waveguide apparatus 100 of FIG. 2, and a difference between the two lies in, for example, that an optical waveguide element 210 of the embodiment includes a first waveguide plate 212 and a second waveguide plate 214. The first waveguide plate 212 and the second waveguide plate 214 are arranged in parallel along a transmission direction Z of the incident light L1. The first waveguide plate 212 and the second waveguide plate 214 each include the optical structure 130. In the embodiment, the first surface S1 is the surface where the first waveguide plate 212 receives the incident light L1, and the second surface S2 is the surface where the second waveguide plate 214 faces the optical recycling element 120. The optical recycling element 120 is disposed on a side of the second surface S2 of the second waveguide plate 214 to reflect the diffracted light, such that the diffracted light enters the first waveguide plate 212 and the second waveguide plate 214 again. Thereby, light utilization efficiency of the optical waveguide element 210 can be enhanced.

Figure 8:
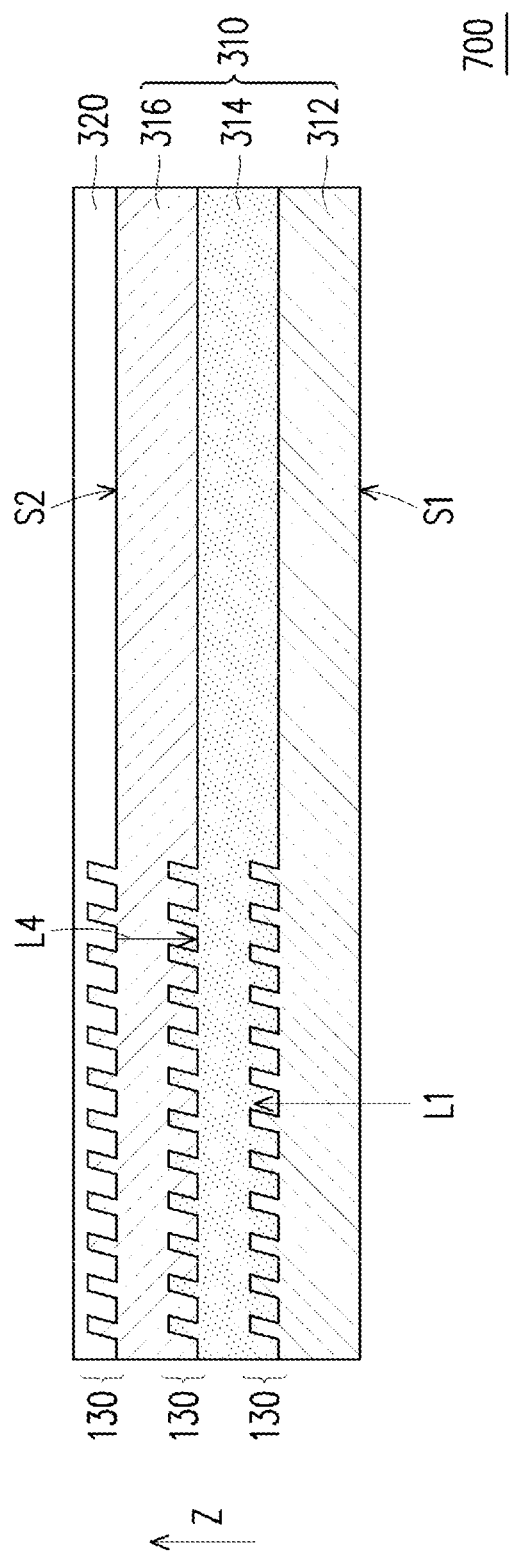
FIG. 8 is a schematic diagram illustrating an optical waveguide apparatus according to another embodiment of the invention.

FIG. 8 is a schematic diagram illustrating an optical waveguide apparatus according to another embodiment of the invention. Referring to FIG. 2 and FIG. 8, an optical waveguide apparatus 700 of the embodiment is similar to the optical waveguide apparatus 100 of FIG. 2, and a difference between the two lies in, for example, that an optical waveguide element 310 of the embodiment includes a first waveguide plate 312, a second waveguide plate 314, and a third waveguide plate 316, and an optical recycling element 320 is an optical film layer disposed on the second surface S2 of the optical waveguide element 310. The first waveguide plate 312, the second waveguide plate 314, and the third waveguide plate 316 are arranged in parallel along the transmission direction Z of the incident light L1. The first waveguide plate 312, the second waveguide plate 314, and the third waveguide plate 316 each include the optical structure 130. In the embodiment, the first surface S1 is the surface where the first waveguide plate 312 receives the incident light L1, and the second surface S2 is the surface where the third waveguide plate 316 faces the optical recycling element 320.

In the embodiment, the incident light L1 includes a first color light, a second color light, and a third color light. The first color light is transmitted in the first waveguide plate 312, the second color light is transmitted in the second waveguide plate 314, and the third color light is transmitted in the third waveguide plate 316. In an embodiment, the first waveguide plate 312, the second waveguide plate 314, and the third waveguide plate 316 are dichroic elements or polarizers (not illustrated) but are not limited hereto. The first color light, the second color light, and the third color light may be controlled to be transmitted respectively in the first waveguide plate 312, the second waveguide plate 314, and the third waveguide plate 316.

In the embodiment, the first waveguide plate 312, the second waveguide plate 314, and the third waveguide plate 316 are, for example, respectively a blue light waveguide plate, a green light waveguide plate, and a red light waveguide plate, and the first color light, the second color light, and the third color light are, for example, respectively a blue light, a green light, and a red light. The incident light L1 enters the optical waveguide element 310 via the first surface S1 and sequentially passes through the blue light waveguide plate, the green light waveguide plate, and the red light waveguide plate. Therefore, the blue light of the incident light L1 has the highest output efficiency, and the red light has the lowest output efficiency. At this time, there is a case of a slightly high color temperature. However, when the recycled light L4 enters the optical waveguide element 310 via the second surface S2, it sequentially passes through the red light waveguide plate, the green light waveguide plate, and the blue light waveguide plate. Therefore, the blue light of the recycled light L4 has the lowest output efficiency, and the red light has the highest output efficiency.

Accordingly, in the optical waveguide apparatus 700 of the embodiment, the recycled light L4 is reflected back to the optical waveguide element 310 by the optical recycling element 320 to compensate for the lower output efficiency of the red light of the incident light L1, and thereby the color temperature of the light output by the optical waveguide element 310 is more uniform.

Figure 9:
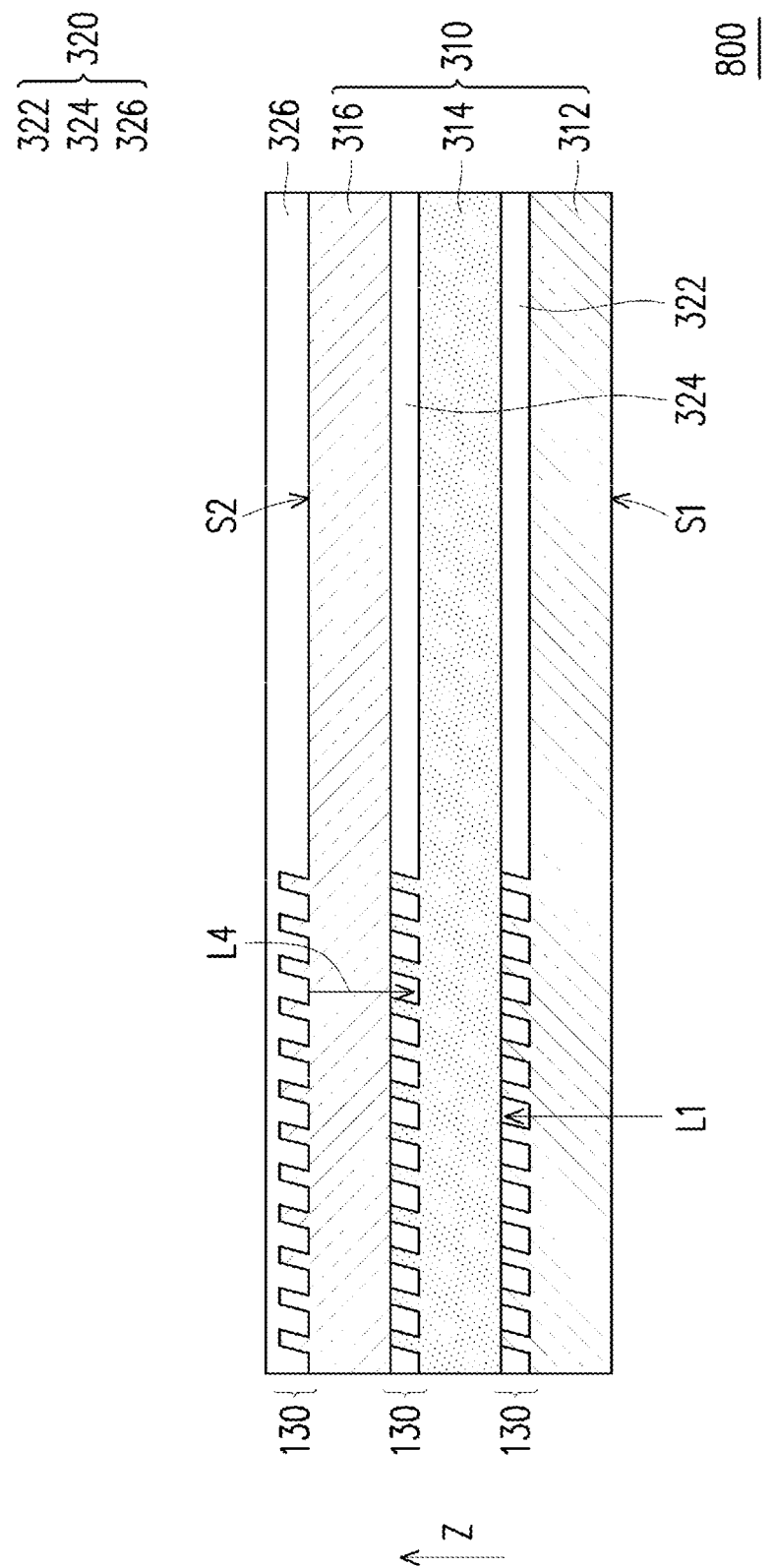
FIG. 9 is a schematic diagram illustrating an optical waveguide apparatus according to another embodiment of the invention.

FIG. 9 is a schematic diagram illustrating an optical waveguide apparatus according to another embodiment of the invention. Referring to FIG. 8 and FIG. 9, an optical waveguide apparatus 800 of the embodiment is similar to the optical waveguide apparatus 700 of FIG. 8, and a difference between the two lies in, for example, that the optical recycling element 320 includes a plurality of optical film layers 322, 324, 326. The optical film layers 322, 324, 326 are, for example, the optical recycling element 320. The optical film layer 322 is disposed between the first waveguide plate 312 and the second waveguide plate 314. The optical film layer 324 is disposed between the second waveguide plate 314 and the third waveguide plate 316. The optical film layer 326 is disposed on the second surface S2 of the optical waveguide element 310.

Figure 10:
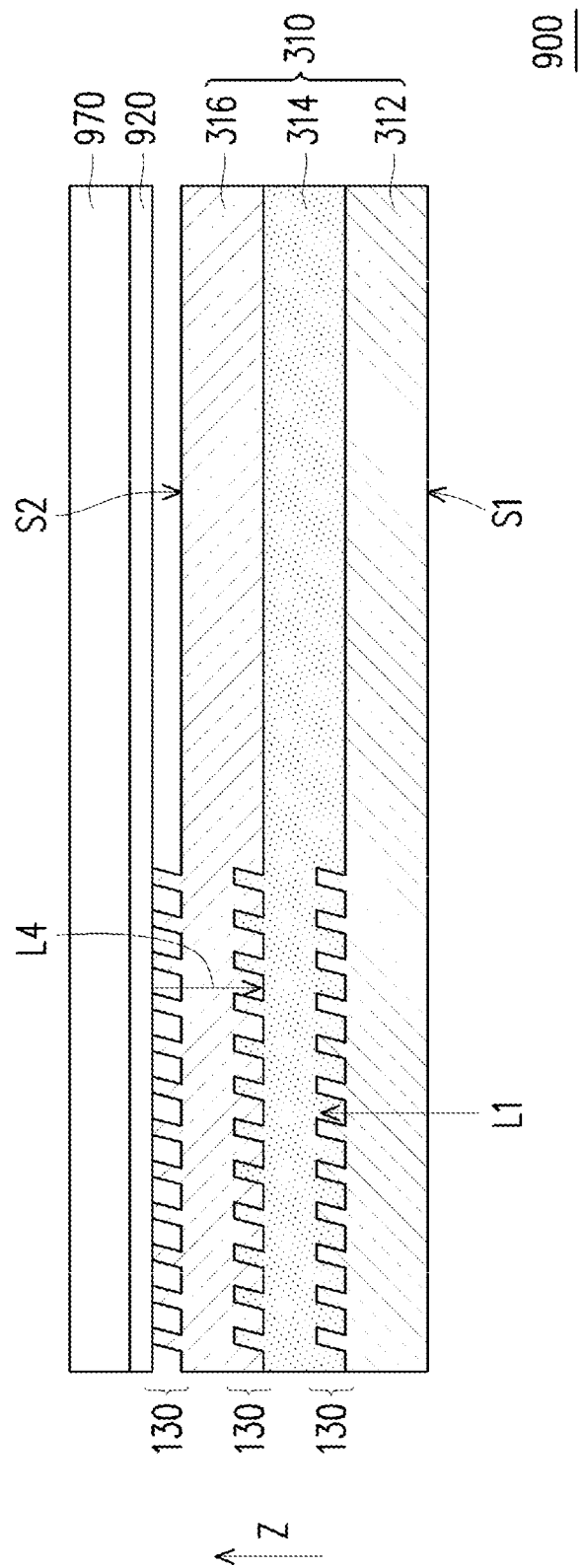
FIG. 10 is a schematic diagram illustrating an optical waveguide apparatus according to another embodiment of the invention.

FIG. 10 is a schematic diagram illustrating an optical waveguide apparatus according to another embodiment of the invention. Referring to FIG. 8 and FIG. 10, an optical waveguide apparatus 900 of the embodiment is similar to the optical waveguide apparatus 700 of FIG. 8, and a difference between the two lies in, for example, that the optical waveguide apparatus 900 further includes a protective element 970, and an optical recycling element 920 is disposed between the optical waveguide element 310 and the protective element 970. The protective element 970 is disposed on a side of the second surface S2 of the optical waveguide element 310. In an embodiment, the protective element 970 is, for example, a cover glass. In other words, in the case that the optical waveguide element 310 includes the cover glass, the optical recycling element 920 may also be disposed between the optical waveguide element 310 and the cover glass.

Figure 11:
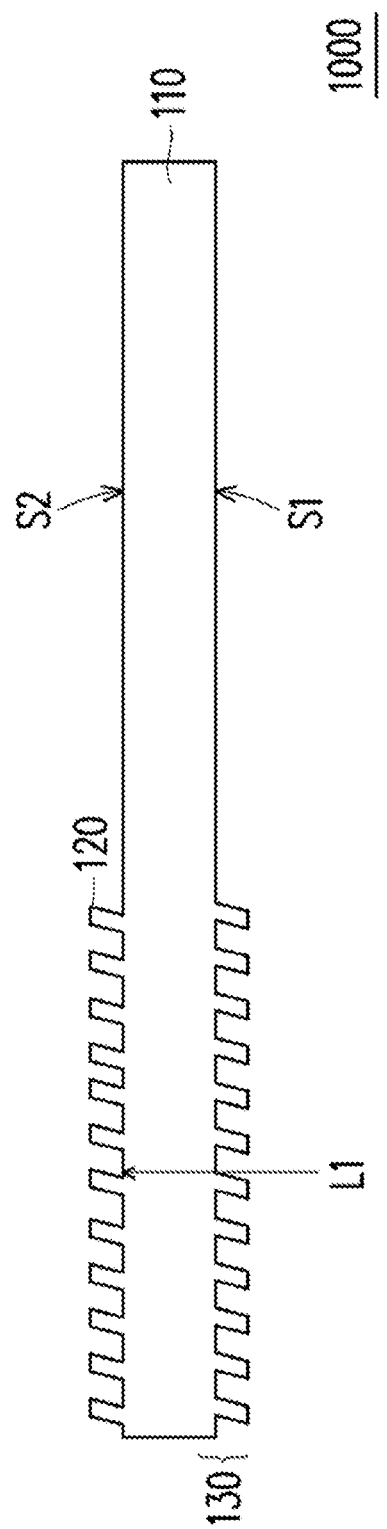
FIG. 11 is a schematic diagram illustrating an optical waveguide apparatus according to still another embodiment of the invention.

FIG. 11 is a schematic diagram illustrating an optical waveguide apparatus according to still another embodiment of the invention. Referring to FIG. 11, an optical waveguide apparatus 1000 of the embodiment includes an optical waveguide element 110 and an optical recycling element 120. The optical waveguide element 110 includes a first surface S1 and a second surface S2. The second surface S2 is opposite to the first surface S1, and the first surface S1 includes an optical structure 130. The optical recycling element 120 is disposed on the second surface S2 of the optical waveguide element 110. Specifically, the optical recycling element 120 is integrally formed on the second surface S2 of the optical waveguide element 110. An incident light L1 is reflected due to the optical recycling element 120 and enters the optical waveguide element 110 again to be transmitted in the optical waveguide element 110. Therefore, light utilization efficiency of the optical waveguide element 110 can be enhanced.

Figure 12:
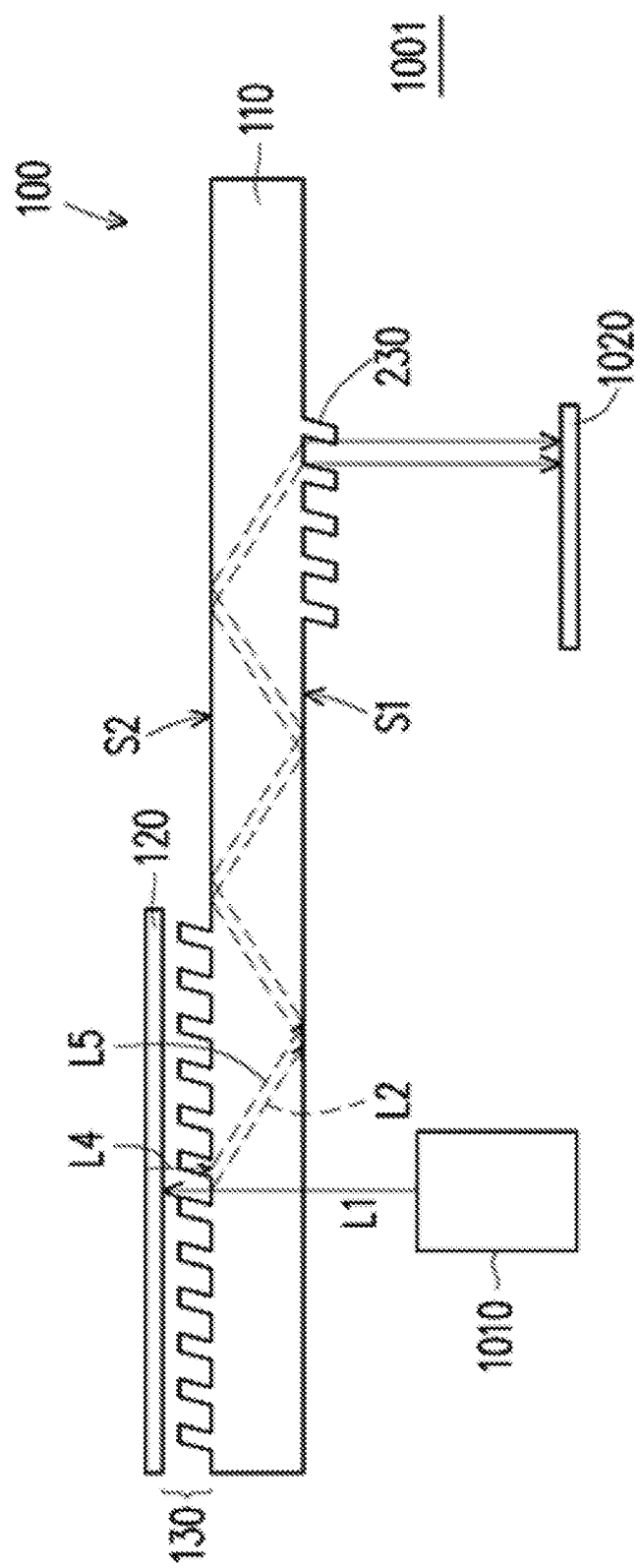
FIG. 12 is a schematic diagram illustrating a display according to an embodiment of the invention.

FIG. 12 is a schematic diagram illustrating a display according to another embodiment of the invention. Referring to FIG. 12, a display 1001 of the embodiment includes a projection apparatus 1010 and an optical waveguide apparatus 100. The projection apparatus 1010 includes a light valve element to project an incident light L1. Specifically, the incident light L1 is an image light beam. The light valve element is, for example, a reflective or transmissive spatial light modulator. The reflective spatial light modulator includes, for example, a reflective liquid crystal on silicon (LCOS) or a digital micro-mirror device (DMD). The transmissive spatial light modulator includes, for example, a transparent liquid crystal panel. The optical waveguide apparatus 100 includes an optical waveguide element 110 and an optical recycling element 120. The optical waveguide element 110 includes a first surface S1 and a second surface S2. The second surface S2 is opposite to the first surface S1 and includes an optical structure 130. The optical recycling element 120 is disposed on a side of the second surface S2 of the optical waveguide element 110.

In the embodiment, the incident light L1 enters the optical waveguide element 110 via the first surface S1. The incident light L1 is transmitted to the optical structure 130 of the second surface S2 to generate a reflective diffracted light L2. The incident light L1 is transmitted to the optical recycling element 120 via the optical structure 130 of the second surface S2. The optical recycling element 120 changes a transmission direction of the incident light L1 to generate a recycled light L4. In the embodiment, the recycled light L4 is, for example, a zero-order diffracted light that is generated after the incident light L1 passes through the optical structure 130 and is reflected by the optical recycling element 120 and then enters the optical waveguide element 110 again. In an embodiment, the recycled light L4 may also be a first-order or high-order diffracted light. The recycled light L4 enters the optical waveguide element 110 via the optical structure 130 of the second surface S2 and is transmitted to the first surface S1. When the recycled light L4 passes through the light-transmissive microstructure region, a refractive diffracted light L5 is generated. The diffracted light L2 is a portion of the incident light L1 and is transmitted in the optical waveguide element 110. The diffracted light L5 is a portion of the recycled light L4 and is transmitted in the optical waveguide element 110.

The incident light L1 is reflected by the optical recycling element 120 due to the optical structure 130 and enters the optical waveguide element 110 again via the optical structure 130 to be transmitted in the optical waveguide element 110. Therefore, light utilization efficiency of the optical waveguide element 110 can be enhanced.

The diffracted light L2 and the diffracted light L5 are transmitted in total reflection in the optical waveguide element 110 to a position of the first surface S1 at which another optical structure 230 is disposed. The diffracted light L2 and the diffracted light L5 pass through the optical waveguide element 110 via the optical structure 230 and are transmitted to a projection target 1020. The projection target 1020 is, for example, a human eye or a light beam receiver (e.g., a camera or an optical sensor) but is not limited hereto.

It is noted that, in an embodiment, the optical recycling element 120 and the second surface S2 are disposed in parallel to each other so that a brightness of an image is enhanced without lowering a resolution of the image. In contrast, in a case where the optical recycling element 120 and the second surface S2 are not disposed in parallel to each other, if the optical recycling element 120 is rotated by an angle (e.g., 2°) along a first-axis direction (X) or the optical recycling element 120 is rotated by an angle (e.g., 2°) along a second-axis direction (Y) such that an included angle is present between the optical recycling element 120 and the second surface S2, the image is offset and the resolution is thus lowered.

Figure 13:
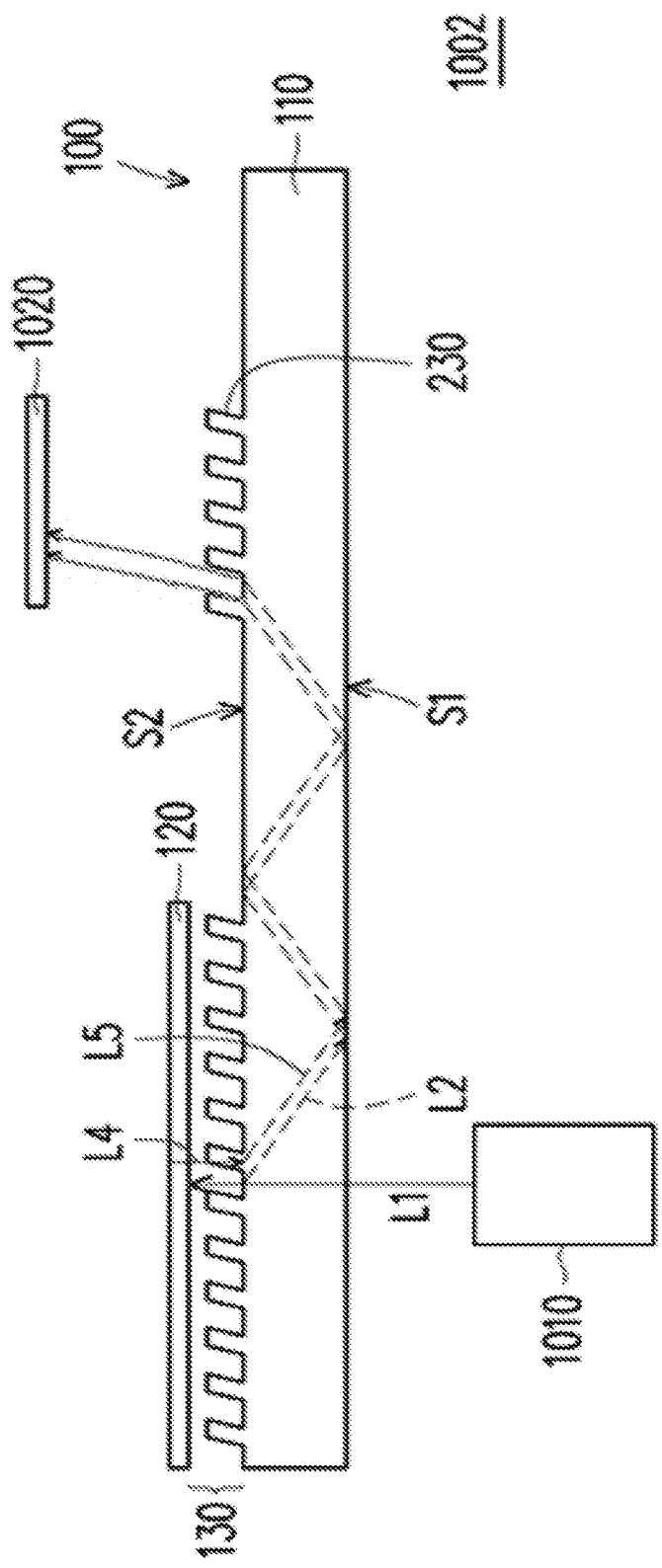
FIG. 13 is a schematic diagram illustrating a display according to another embodiment of the invention.

FIG. 13 is a schematic diagram illustrating a display according to another embodiment of the invention. Referring to FIG. 12 and FIG. 13, a display 1002 of the embodiment is similar to the display 1001 of FIG. 12, and a difference between the two lies in, for example, that the another optical structure 230 of the embodiment is disposed on the second surface S2 of the optical waveguide element 110. The diffracted light L2 and the diffracted light L5 are transmitted in total reflection in the optical waveguide element 110 to the position of the optical structure 230 of the second surface S2. The diffracted light L2 and the diffracted light L5 pass through the optical waveguide element 110 via the optical structure 230 and are transmitted to a projection target 1020. The projection target 1020 is, for example, a human eye or a light beam receiver (e.g., a CCD (charge-coupled device), a CMOS (complementary metal-oxide semiconductor), etc.) but is not limited hereto. Through the arrangement of the optical structure 230, the diffracted light L2 and the diffracted light L5 are transmitted out of the optical waveguide element 110 and are transmitted to the projection target 1020. It is noted that the invention does not limit that the diffracted light beam has to leave the optical waveguide element 110 via the first surface S1 if the optical structure 230 is disposed on the first surface S1. It is also possible that the diffracted light beam may leave the optical waveguide element 110 via the second surface S2, which shall depend on the manufacturer's design of the light travel paths.

In summary of the above, the embodiments of the invention at least exhibit one of the advantages or effects below. In the embodiments of the invention, the optical waveguide apparatus includes the optical recycling element that reflects the incident light and generates the recycled light to enhance optical efficiency of the optical waveguide apparatus. The optical waveguide element may include one or a plurality of waveguide plates. The optical recycling element may also be disposed between each two of the plurality of waveguide plates. The optical waveguide element may include waveguide plates of different colors that function with the optical recycling element to compensate for the color temperature, such that the color temperature of the light output by the optical waveguide apparatus is more consistent with that output by the optical machine.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical waveguide apparatus comprising:
an optical waveguide element comprising:
a first surface; and
a second surface opposite to the first surface, wherein an optical structure formed on the first surface or the second surface is a diffractive structure for generating a diffracted light beam, the diffractive structure comprises a light-transmissive microstructure region, and an incident light enters the optical waveguide element via the first surface and is transmitted to the second surface; and
an optical recycling element disposed on the second surface of the optical waveguide element, wherein the incident light is transmitted to the optical recycling element via the second surface, the optical recycling element changes a transmission direction of the incident light to generate a recycled light, the recycled light passes through the light-transmissive microstructure region to generate a refractive diffracted light by refractive diffraction, the refractive diffracted light enters the optical waveguide element via the second surface and is transmitted to the first surface, and the incident light and the refractive diffracted light are transmitted in the optical waveguide element, and then the incident light and the refractive diffracted light transmit into a projection target after leaving the optical waveguide element.

2. The optical waveguide apparatus of claim 1, wherein the optical structure is formed on the first surface of the optical waveguide element, the incident light enters the optical waveguide element by refractive diffraction via the first surface, and the refractive diffracted light is transmitted to the first surface via the second surface and undergoes reflective diffraction at the optical structure to be transmitted in the optical waveguide element.

3. The optical waveguide apparatus of claim 1, wherein the optical structure is formed on the second surface of the optical waveguide element, the incident light is transmitted to the second surface via the first surface and undergoes reflective diffraction at the optical structure to be transmitted in the optical waveguide element.

4. The optical waveguide apparatus of claim 1, wherein the optical recycling element is selected from one of a reflection mirror, a band pass filter, a dichroic mirror, a diffraction element, and a planar optical element.

5. The optical waveguide apparatus of claim 1, wherein the optical recycling element comprises an optical film layer, and the optical film layer is disposed on a surface of the optical structure.

6. The optical waveguide apparatus of claim 1, wherein the optical waveguide element comprises one single waveguide plate, and the first surface and the second surface are two opposite surfaces of the one single waveguide plate.

7. The optical waveguide apparatus of claim 1, wherein the optical waveguide element comprises a first waveguide plate and a second waveguide plate, wherein the first waveguide plate and the second waveguide plate each comprises the optical structure, the first waveguide plate and the second waveguide plate are arranged in parallel along a light transmission direction, the first surface is a surface where the first waveguide plate receives the incident light, and the second surface is a surface where the second waveguide plate faces the optical recycling element.

8. The optical waveguide apparatus of claim 1, wherein the optical waveguide element comprises a first waveguide plate, a second waveguide plate, and a third waveguide plate, wherein the first waveguide plate, the second waveguide plate, and the third waveguide plate each comprises the optical structure, the first waveguide plate, the second waveguide plate, and the third waveguide plate are arranged in parallel along a light transmission direction, the first surface is a surface where the first waveguide plate receives the incident light, and the second surface is a surface where the third waveguide plate faces the optical recycling element.

9. The optical waveguide apparatus of claim 8, wherein the incident light comprises a first color light, a second color light, and a third color light, wherein the first color light is transmitted in the first waveguide plate, the second color light is transmitted in the second waveguide plate, and the third color light is transmitted in the third waveguide plate.

10. The optical waveguide apparatus of claim 8, wherein the optical recycling element is further disposed between the first waveguide plate and the second waveguide plate and between the second waveguide plate and the third waveguide plate.

11. The optical waveguide apparatus of claim 1, further comprising a protective element disposed on a side of the second surface of the optical waveguide element, wherein the optical recycling element is disposed between the optical waveguide element and the protective element.

12. The optical waveguide apparatus of claim 1, wherein the first surface comprises the optical structure, the incident light enters the optical waveguide element via the first surface and is transmitted to the second surface, and the optical recycling element is integrally formed on the second surface of the optical waveguide element, wherein the optical recycling element is a diffraction element.

13. The optical waveguide apparatus of claim 1, wherein the optical waveguide element comprises another optical structure, and the incident light and the refractive diffracted light are transmitted to a projection target via the another optical structure.

14. A display for projecting an image light beam to a projection target, the display comprising:
  a projection apparatus, adapted to project an incident light, wherein the incident light is the image light beam; and
  an optical waveguide apparatus comprising:
    an optical waveguide element, comprising:
      a first surface; and
      a second surface opposite to the first surface, wherein an optical structure formed on the first surface or the second surface is a diffractive structure for generating a diffracted light beam, and the incident light enters the optical waveguide element via the first surface and is transmitted to the second surface; and
    an optical recycling element, disposed on the second surface of the optical waveguide element, wherein the incident light is transmitted to the optical recycling element via the second surface, the optical recycling element changes a transmission direction of the incident light to generate a recycled light, the recycled light passes through the diffractive structure to generate a refractive diffracted light by refractive diffraction, the refractive diffracted light enters the optical waveguide element via the second surface and is transmitted to the first surface, and the incident light and the refractive diffracted light are transmitted in the optical waveguide element, and then the incident light and the refractive diffracted light transmit into the projection target after leaving the optical waveguide element.

* * * * *